(12) United States Patent
Verbeke et al.

(10) Patent No.: US 11,535,260 B2
(45) Date of Patent: Dec. 27, 2022

(54) ATTENTION-BASED NOTIFICATIONS

(71) Applicant: HARMAN INTERNATIONAL INDUSTRIES, INCORPORATED, Stamford, CT (US)

(72) Inventors: Joseph Verbeke, San Francisco, CA (US); Mingwen Dong, Edison, NJ (US); Sven Kratz, Saratoga, CA (US); Adam Boulanger, Palo Alto, CA (US); Stefan Marti, Oakland, CA (US); Evgeny Burmistrov, Saratoga, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 280 days.

(21) Appl. No.: 16/810,760

(22) Filed: Mar. 5, 2020

(65) Prior Publication Data

US 2021/0276568 A1 Sep. 9, 2021

(51) Int. Cl.
*B60W 40/08* (2012.01)
*B60R 21/015* (2006.01)
(Continued)

(52) U.S. Cl.
CPC ............ *B60W 40/08* (2013.01); *B60K 35/00* (2013.01); *B60R 11/04* (2013.01);
(Continued)

(58) Field of Classification Search
CPC . B60W 40/08; B60W 50/14; B60R 21/01552; B60R 11/04; B60K 35/00; G06F 3/015
See application file for complete search history.

(56) References Cited

U.S. PATENT DOCUMENTS 8,106,783 B2    1/2012  Wada et al.
8,798,736 B2 *  8/2014  Sullivan .................. G06F 3/015
                                                    600/544
(Continued)

FOREIGN PATENT DOCUMENTS

JP    2002-367100 A      12/2002
JP       4733242 B2 *     7/2011    ........... A61B 5/0006
(Continued)

OTHER PUBLICATIONS

Naber et al. "Tracking the allocation of attention using human pupillary oscillations." Frontiers in Psychology, vol. 4, Article 919, Dec. 2013, doi:10.3389/fpsyg.2013.00919. Available at https://www.ncbi.nlm.nih.gov/pmc/articles/PMC3857913/, 12 pages.
(Continued)

*Primary Examiner* — Luis A Martinez Borrero
(74) *Attorney, Agent, or Firm* — Artegis Law Group, LLP

(57) ABSTRACT

A system may present notifications to an occupant of a vehicle and determine whether the occupant has given attention to the notification. The system oscillates a visual notification at an output frequency. The system captures images of an eye of the occupant to determine an eye pupil oscillation frequency associated with the occupant. The system compares the eye pupil oscillation frequency to the output frequency. The system determines whether attention was given to the notification based on whether the output frequency and the eye pupil oscillation frequency match. If the system determines that attention was not given, the system may cause performance of one or more follow-up operations.

20 Claims, 6 Drawing Sheets

(51) Int. Cl.
    *B60K 35/00*         (2006.01)
    *B60R 11/04*         (2006.01)
    *B60W 50/14*        (2020.01)
    *G06F 3/01*          (2006.01)
    *G06V 20/59*        (2022.01)
    *G06V 40/19*        (2022.01)

(52) U.S. Cl.
    CPC ....... *B60R 21/01552* (2014.10); *B60W 50/14* (2013.01); *G06F 3/015* (2013.01); *G06V 20/597* (2022.01); *G06V 40/19* (2022.01); *B60W 2040/0818* (2013.01); *B60W 2040/0872* (2013.01); *B60W 2050/146* (2013.01); *B60W 2540/221* (2020.02); *B60W 2540/225* (2020.02); *B60W 2540/229* (2020.02)

(56) References Cited

U.S. PATENT DOCUMENTS

| | | | | |
|---|---|---|---|---|
| 9,296,382 | B2* | 3/2016 | Fung | B60W 10/04 |
| 9,469,247 | B2* | 10/2016 | Juneja | B60Q 9/00 |
| 9,552,064 | B2* | 1/2017 | He | G06F 3/0325 |
| 9,795,015 | B2* | 10/2017 | Di Censo | H05B 47/19 |
| 9,870,764 | B2* | 1/2018 | Marti | G10K 11/1754 |
| 10,149,958 | B1* | 12/2018 | Tran | G06V 40/19 |
| 10,416,763 | B2* | 9/2019 | He | G06V 40/193 |
| 10,421,465 | B1* | 9/2019 | Jutkowitz | G05D 1/0061 |
| 10,660,570 | B2* | 5/2020 | Cimenser | G06F 1/163 |
| 10,671,170 | B2* | 6/2020 | Boulanger | B60W 50/16 |
| 10,720,153 | B2* | 7/2020 | Di Censo | G10K 11/1783 |
| 10,837,944 | B2* | 11/2020 | Boulanger | G01H 1/00 |
| 10,921,899 | B2* | 2/2021 | Verbeke | H04N 9/3194 |
| 11,009,954 | B2* | 5/2021 | Verbeke | H04R 1/40 |
| 11,167,775 | B2* | 11/2021 | Zhang | B60W 30/095 |
| 2007/0069901 | A1* | 3/2007 | Tuck | H04L 67/535 340/573.1 |
| 2007/0280505 | A1* | 12/2007 | Breed | B60W 40/08 382/104 |
| 2008/0037803 | A1* | 2/2008 | Breed | H04R 5/02 381/86 |
| 2008/0234899 | A1* | 9/2008 | Breed | B60R 21/01516 701/1 |
| 2012/0220889 | A1* | 8/2012 | Sullivan | A61B 5/378 600/544 |
| 2015/0070273 | A1* | 3/2015 | He | G06F 3/013 348/78 |
| 2015/0145777 | A1* | 5/2015 | He | G06V 40/193 348/78 |
| 2016/0001781 | A1* | 1/2016 | Fung | G16H 50/20 701/36 |
| 2016/0282939 | A1* | 9/2016 | Sørensen | G06F 3/015 |
| 2017/0131766 | A1* | 5/2017 | He | G06F 3/0325 |
| 2017/0188823 | A1* | 7/2017 | Ganesan | A61B 3/113 |
| 2018/0133431 | A1* | 5/2018 | Malchano | A61B 5/377 |
| 2018/0133507 | A1* | 5/2018 | Malchano | A61B 5/0036 |
| 2018/0184974 | A1* | 7/2018 | Cimenser | A61B 5/38 |
| 2018/0322783 | A1* | 11/2018 | Toyoda | B60W 50/14 |
| 2019/0380607 | A1* | 12/2019 | Connor | A61B 5/369 |
| 2021/0041953 | A1* | 2/2021 | Poltorak | A61B 5/377 |
| 2022/0008746 | A1* | 1/2022 | Malchano | A61B 5/0036 |
| 2022/0117548 | A1* | 4/2022 | Botrashvili | G09B 19/00 |

FOREIGN PATENT DOCUMENTS

| | | | | |
|---|---|---|---|---|
| JP | 2013027438 | A * | 2/2013 | ........... A61B 5/0006 |
| JP | 2014-232583 | A | 12/2014 | |
| JP | 6145871 | B2 | 6/2017 | |

OTHER PUBLICATIONS

Extended European Search Report for application No. 21161081.1 dated Jul. 19, 2021.

* cited by examiner

ATTENTION-BASED NOTIFICATIONS

BACKGROUND

Field of the Various Embodiments

The various embodiments relate generally to device notifications, and more specifically, to attention-based notifications.

DESCRIPTION OF THE RELATED ART

A vehicle, during operation, may deliver different pieces of information to an occupant of the vehicle, such as a driver. The information may include information concerning the status of the vehicle and/or a subsystem within, information concerning the environment around the vehicle, information concerning in-vehicle operations or entertainment, and so on. The vehicle may deliver information to the occupant visually, audibly, or tactilely.

Conventional approaches for visual information delivery by a vehicle typically include lighting up an indicator and/or displaying an alert or notification on a display. A drawback of these approaches is that the vehicle does not know whether the occupant actually gave the indicator or notification any attention unless the occupant interacts with the indicator or notification. For example, a notification may prompt the occupant for a yes/no response input and may remain displayed until the occupant makes the input. As another example, a notification may be displayed indefinitely unless the occupant dismisses the notification. Enforced interaction with an indicator or notification can distract the occupant from more important tasks, such as operating the vehicle or attending to another occupant of the vehicle.

An attempt to resolve this drawback involves detecting a direction of the eye gaze of the occupant. For example, a vehicle may include a camera system that tracks the eyes of the occupant. If a direction of the eye gaze aligns with a notification, then the occupant is determined to have given attention to the notification. A drawback of this approach is that eye gaze is an unreliable criterion for determining attention. An occupant may give a notification no attention even if the notification is in the focal view of the occupant. For example, the occupant may be daydreaming and thus not attentive to a notification that is in the focal view. As another example, there may be multiple notifications in the focal view. Determining attention given to each of the multiple notifications based on eye gaze may be difficult.

As the foregoing illustrates, what is needed are more effective techniques for determining attention given to a notification.

SUMMARY

One or more embodiments set forth a computer-implemented method, including causing a first visual stimulus to be oscillated at a first frequency, determining a second frequency associated with a user characteristic, and based on a determination that the second frequency does not match the first frequency, causing one or more operations to be performed.

Further embodiments provide, among other things, a system and one or more computer-readable storage media configured to implement the method set forth above.

At least one advantage and technological improvement of the disclosed techniques is that a computing system (e.g., a computing device of a vehicle) may determine attention or lack thereof given to a notification without requiring an interactive response from the user. Accordingly, the computing system can ascertain whether a user (e.g., an occupant of the vehicle) is attentive to the notification, without distracting the user from other tasks.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
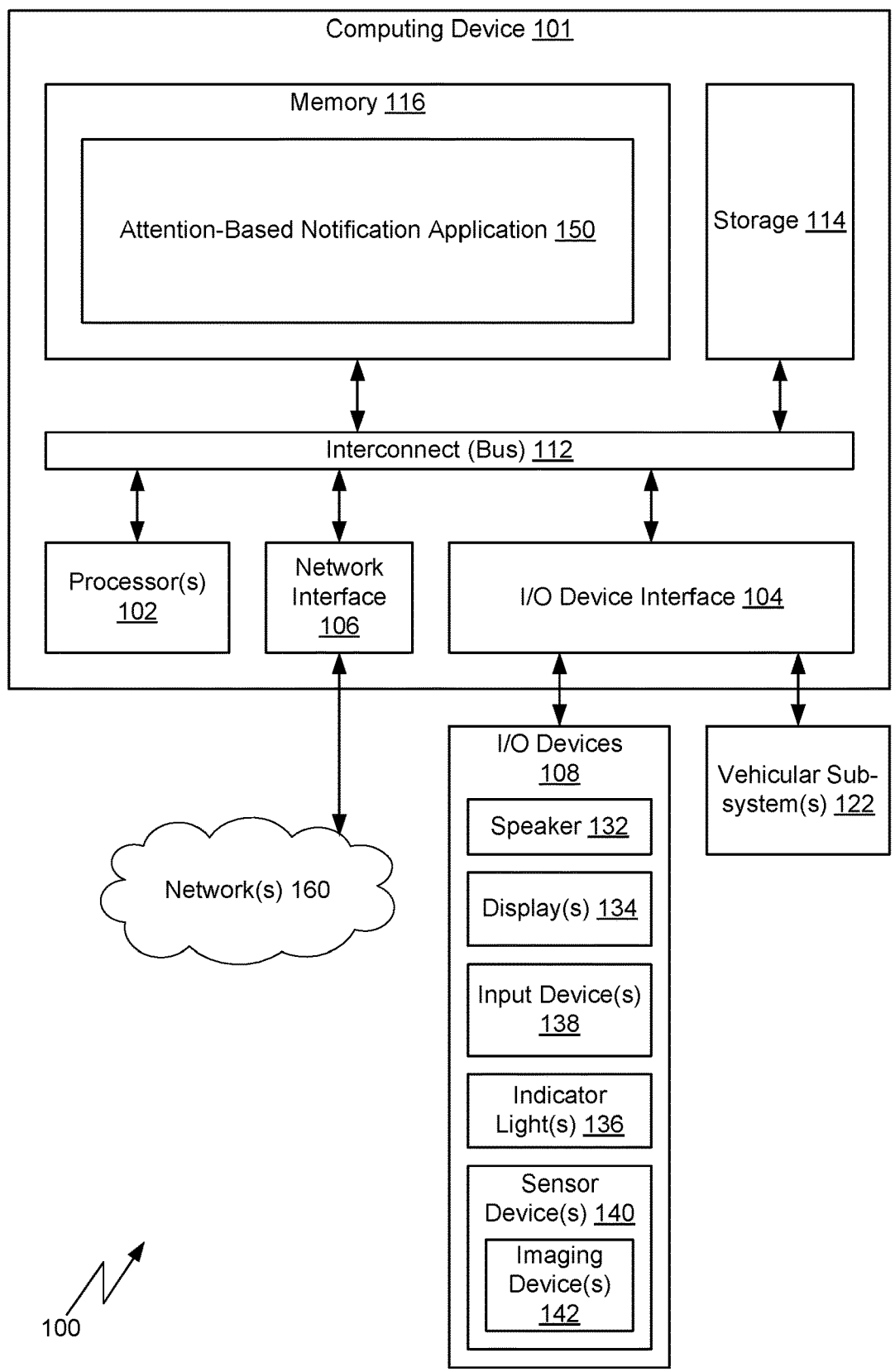
FIG. 1 illustrates a block diagram of a computing system of a vehicle, according to one or more aspects of the various embodiments.

FIG. 1 illustrates a block diagram of a computing system 100 of a vehicle, according to one or more aspects of the various embodiments. Computing system 100 may control and/or interact with one or more components and/or subsystems of a vehicle. Computing system 100 includes a computing device 101. In some embodiments, computing device 101 may be the head unit of the vehicle. As shown, computing device 101 includes, without limitation, one or more processors 102, I/O device interface 104, network interface 106, interconnect 112, storage 114, and memory 116. Processor(s) 102 and memory 116 may be implemented in any technically feasible fashion. For example, and without limitation, in various embodiments, any combination of the processor 102 and the memory 116 may be implemented as a stand-alone chip or as part of a more comprehensive solution that is implemented as an application-specific integrated circuit (ASIC), a system-on-a-chip (SoC), and/or the like. Processor(s) 102, I/O device interface 104, network interface 106, storage 114, and memory 116 may be communicatively coupled to each other via interconnect 112.

The one or more processors 102 may include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 102 may be any technically feasible hardware unit capable of processing data and/or executing software applications and modules.

Storage 114 may include non-volatile storage for applications, software modules, and data, and may include fixed or removable disk drives, flash memory devices, and CD-ROM, DVD-ROM, Blu-Ray, HD-DVD, or other magnetic, optical, solid state storage devices, and/or the like.

Memory 116 may include a random access memory (RAM) module, a flash memory unit, or any other type of memory unit or combination thereof. The one or more processors 102, I/O device interface 104, and network interface 106 are configured to read data from and write data to memory 116. Memory 116 includes various software programs and modules (e.g., an operating system, one or more applications) that can be executed by processor(s) 102 and application data (e.g., data loaded from storage 114) associated with said software programs.

In some embodiments, computing device 101 is communicatively coupled to one or more networks 160. Network 160 may be any technically feasible type of communications network that allows data to be exchanged between computing device 101 and remote systems or devices (not shown), such as a server, a cloud computing system, or other networked computing device or system. For example, network 160 may include a wide area network (WAN), a local area network (LAN), a wireless network (e.g., a Wi-Fi network, a cellular data network), and/or the Internet, among others. Computing device 101 may connect with network(s) 160 via network interface 106. In some embodiments, network interface 106 is hardware, software, or a combination of hardware and software, that is configured to connect to and interface with network(s) 160.

I/O devices 108 may include devices capable of providing input, such as a touchpad, a touch-sensitive screen, buttons, knobs, dials, joysticks, a microphone, and so forth, as well as devices capable of providing output, such as a display device, audio speaker, indicator lights, etc. For example, I/O devices 108 may include an audio speaker 132, one or more display devices 134, various input devices 138 (e.g., buttons, knobs, dials, etc.), and indicator lights 136 (e.g., indicators on a dashboard, a center console, a driver instrument panel, a side view mirror, etc.). Examples of displays 134 include, without limitation, LCD displays, LED displays, touch-sensitive screens, transparent displays, projection systems (e.g., a heads-up display projection system, a windshield projection system, a micro projection system), optical combiners, etc. Additionally, I/O devices 108 may include devices capable of both receiving input and providing output, such as a touch-sensitive screen, a universal serial bus (USB) port, and/or the like.

I/O devices 108 further include one or more sensor devices 140 that measure and/or monitor various characteristics inside the vehicle and/or in the environment around the vehicle. Sensor devices 140 include one or more imaging devices 142 (e.g., an RGB camera, an infrared camera). Imaging devices 142 include at least one imaging device directed at the driver seat within the vehicle, such that at least one eye of the driver sitting at the driver seat is in the field of view of the imaging device. The imaging device may be adjusted automatically and/or manually to position the field of the view of the imaging device to cover one or both eyes of the driver. In some embodiments, imaging devices 142 are configured to capture images at 30 frames per second or higher. Imaging devices 142 may include additional imaging devices positioned and oriented to capture images of the inside and/or the outside of the vehicle. Sensor devices 140 may include additional sensor devices, examples of which include, without limitation, accelerometers, gyroscopes, biometric sensors, temperature sensors, rotation sensors, vibration sensors, door closure sensors, light sensors, geographic location sensors (e.g., GPS module), and/or the like.

Computing device 101 may be coupled, via I/O device interface 104, to one or more vehicular sub-systems 122 of the vehicle. Vehicular sub-systems 122 include sub-systems associated with various aspects, functions, and/or components of the vehicle. For example, the vehicle may include a fuel sub-system, a tire sub-system, an engine sub-system, a transmission sub-system, a driver assistance sub-system, a maintenance tracking sub-system, a vehicle door sub-system, a navigation sub-system, an infotainment sub-system, and/or the like. These sub-systems may monitor various aspects of the vehicle (e.g., remaining fuel capacity, engine revolutions per minute, engine issues, engine temperature, tire pressure, miles remaining before next suggested maintenance activity, pedestrians and other vehicles nearby, etc.) and/or perform various operations in conjunction with I/O devices (e.g., sensor devices 140) and detect trigger conditions for notifications associated with these aspects or operations (e.g., remaining fuel below a certain threshold level, tire pressure below a certain threshold amount, periodic status notifications, a pedestrian suddenly entering into the path of the vehicle, end of music playback, etc.). In some embodiments, one or more of sensor devices 140 and/or one or more of I/O devices 108 are included in vehicular sub-systems 122. In some embodiments, a vehicular sub-system 122 includes hardware components, software modules, or a combination of hardware components and software modules, and these hardware components and software modules may be implemented in any technically feasible manner. When a vehicular sub-system 122 detects a trigger condition for a notification, the vehicular sub-system 122 transmits a notification signal to computing device 101 in order to cause output of a visual notification via I/O devices 108 (e.g., display(s) 134, indicator light(s) 136, and/or the like).

As used herein, a notification (which may also be called an "alert") is a presentation of information within the vehicle. The information presented in a notification may be about the vehicle (e.g., a state of a component of the vehicle), about an occupant of the vehicle, and/or about the environment around the vehicle (e.g., a vehicle in a blind spot, an obstacle in the path of the vehicle, and/or the like). A notification may be visual, tactile, and/or auditory. A visual notification may include text, graphics, symbol(s) (e.g., an icon), and/or any combination thereof. An auditory notification may include speech and/or non-speech sounds (e.g., tones, beeps, and/or the like). A tactile (or "haptic") notification may include vibrations, motions, and/or force feedback. Examples of notifications include, without limitation, a low fuel alert (which may include a number indicating an approximate remaining range), an engine overheating warning, a low tire pressure alert, a vehicle door ajar alert, a lane departure alert, a blind spot alert, an alert to warn of decreasing distance to an obstacle in a direction of travel, a maintenance action due alert, and so forth.

Memory 116 includes an attention-based notification application 150 (hereinafter "notification application 150"). Notification application 150 may be stored in and loaded from storage 114. In operation, notification application 150 receives notification signals from vehicular sub-systems 122, outputs notifications corresponding to the notification signals to a user (e.g., a vehicle occupant, such as the driver) via I/O devices 108 (e.g., display 134, indicator light 136, speaker 132, and/or the like), obtaining sensor data associated with the user, and determining attention given to the notifications by the user based on the sensor data using a technique based on pupil frequency tagging. In particular, in various embodiments, notification application 150 outputs a visual notification at a certain oscillation frequency (e.g., frequency of oscillation of a brightness of the notification). Notification application 150 further determines attention given to the notification (or lack thereof) based on the sensor data, in particular whether the sensor data shows the user exhibiting a response (e.g., constrictions and dilations of the pupils of the user) at substantially or approximately the same oscillation frequency. In some embodiments, notification application 150 may perform further operations based on the determined attention or lack thereof. Operation of notification application 150 is further described below in conjunction with FIGS. 2-5.

Figure 2:
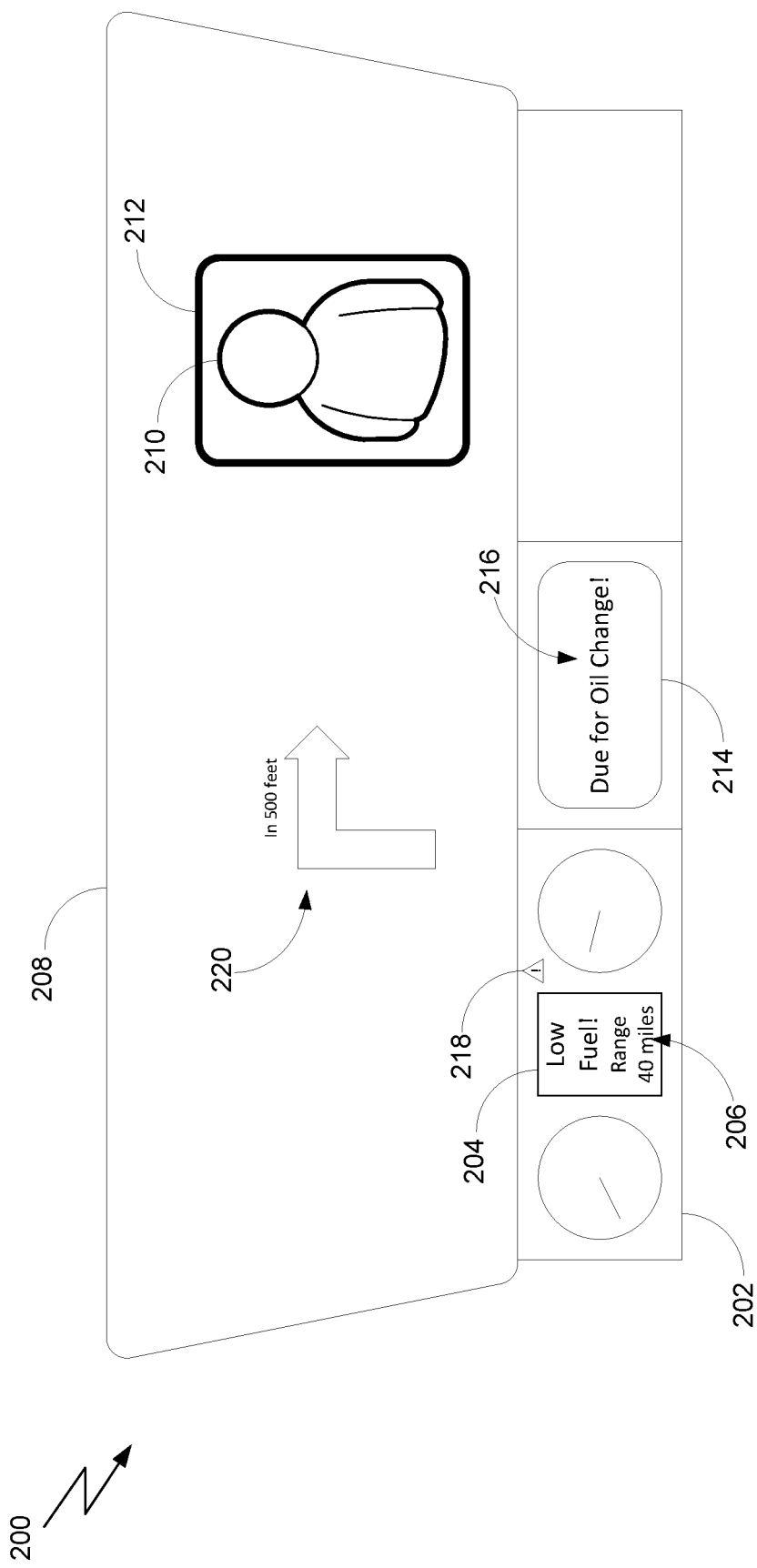
FIG. 2 illustrates example notifications that may be presented within a vehicle, according to one or more aspects of the various embodiments.

FIG. 2 illustrates example notifications that may be presented within a vehicle, according to one or more aspects of the various embodiments. FIG. 2 illustrates a vehicle interior 200, in particular a view from the vehicle interior toward front windshield 208. Vehicle interior 200 includes a driver dashboard or instrument panel 202, which may include various instrumentation and gauges, such as a speedometer, odometer, tachometer, etc. Dashboard 202 may further include one or more indicator lights 136, each of which corresponds to a different symbol or icon that convey particular information defined by a manufacturer or designer of the vehicle. For example, indicator light 218 on dashboard 202 lights up a symbol that indicates an ajar vehicle door, and other indicator lights 136 on dashboard 202 may light up symbols that have other defined meanings and/or convey other defined information. Vehicle interior 200 may also include one or more displays 134, examples of which include a dashboard display 204 in the middle of dashboard 202, a center console display 214 (e.g., an infotainment and/or navigation display), and a heads-up display projection system (not shown) that projects augmented reality content (e.g., notifications, landmark information, navigation information) onto front windshield 208, an optical combiner configured to output content such that the content appears to be outside of front windshield 208, or another panel within vehicle interior 200. Additionally or alternatively, front windshield 208 may be part of a transparent display. Notification application 150, in operation, may present visual notifications to an occupant of the vehicle (e.g., the driver) via any of the displays 134 and indicator lights 136 in vehicle interior 200.

For example, when a vehicular sub-system 122 (e.g., a fuel sub-system) determines that the remaining fuel in the vehicle is less than a certain threshold (which may be one of multiple remaining fuel thresholds), the fuel sub-system may send a notification signal to notification application 150 in order to activate presentation of a low fuel notification. The notification signal may include the content of information (e.g., a remaining range in a low fuel notification) to be conveyed in a notification and a modality (e.g., whether the notification is visual, tactile, and/or auditory, whether the notification will be presented via an indicator light and/or text, which display in vehicle interior 200 to present the notification) of the notification. In some embodiments, the notification signal may include a code that corresponds to a type of (and implicitly to the contents, and optionally to the modality, of) the notification. For example, the vehicle may include a predefined code set, and each code in the code set is mapped to a specific notification, including the associated content and modality. A notification signal may include the code for the intended notification from the code set, and notification application 150 generates a notification based on the mapping of the code to the corresponding notification. In some embodiments, the modality may be omitted if the information to be conveyed is associated with one modality. Continuing with the above example, the notification signal for the low fuel notification may indicate that the notification be presented textually in dashboard display 204. The notification signal may further include a value of 40 (e.g., 40 miles) for the remaining range information in the low fuel alert.

In response to receiving the notification signal from the fuel sub-system, notification application 150 generates a notification to be displayed on dashboard display 204. For example, notification application 150 may generate a notification 206 that reads "Low Fuel! Range 40 miles." In some examples, notification application 150 may additionally select an oscillation frequency for the notification. The oscillation frequency is a frequency at which notification application 150 oscillates the notification when the notification is displayed. In some embodiments, the frequency is selected from a predefined set of frequencies (e.g., in a table of frequencies stored in storage 114). In some other embodiments, the frequency is selected randomly from a predefined range of frequencies. In some embodiments, the predefined set of frequencies or predefined range of frequencies are defined by the manufacturer or designer of the vehicle empirically to optimize the detectability of eye pupil oscillation frequencies in response to oscillations of notifications.

After notification 206 is generated and an oscillation frequency is selected, notification application 150 outputs notification 206 to dashboard display 204 with an oscillation at the selected oscillation frequency. In some embodiments, notification application 150 oscillates an amplitude of a brightness of notification 206 on dashboard display 204 at the selected frequency. Oscillating the brightness (in particular, the amplitude of the brightness) may include adjusting the brightness of the content (e.g., the text) of notification 206, adjusting the brightness of the background of notification 206, or a combination thereof. In some embodiments, the adjusting of the brightness includes a transition back and forth between a first brightness level (e.g., a comparatively higher brightness level) and a second brightness level (e.g., a comparatively lower brightness level). In some embodiments, the first and second brightness levels are selected by notification application 150 to have a sufficiently large separation to be detectable in view of a level of ambient light around the occupant. The level of ambient light around the occupant may be detected via sensor devices 140 (e.g., light sensors). The transition between the first and second brightness levels may be gradual (e.g., a continuous transition) or discrete (e.g., a stepwise transition). In some examples, an amount of time that notification 206 is at each of the brightness levels may be the same or different. While notification 206 is displayed with the oscillation, notification application 150 obtains a sequence of images of at least one eye of the vehicle occupant via an imaging device 142 within the vehicle. For example, notification application 150 may perform object recognition and/or any other technically feasible technique (e.g., face box detection), based on images captured by imaging device 142, to recognize an eye (in particular, the pupil of the eye) of the occupant, and optionally orient imaging device 142 toward the eye of the occupant. Notification application 150 may then capture a sequence of images of the eye via imaging device 142. Notification application 150 then processes the sequence of images to measure changes in the diameter of the pupil of the eye over a period of time, and determine a frequency exhibited by the eye (e.g., a frequency of pupil constrictions and dilations of the eye) based on the pupil diameter changes. In some embodiments, the processing of the images of the eye and determination of the eye pupil oscillation frequency may account for delays in data acquisition and signal processing by checking pupil diameter changes for multiple periods (e.g., 5-10 periods) before determining the eye pupil oscillation frequency.

If the oscillation frequency of notification 206 and the eye pupil oscillation frequency do not match (e.g., the difference between the two frequencies is outside of a predefined tolerance), then notification application 150 determines that the occupant has not given attention to notification 206. In response, notification application 150 may then send a negative attention signal to the fuel sub-system, in which case the fuel sub-system may send another notification signal to notification application 150. The another notification signal may indicate additional or alternative modalities for the notification and/or additional or alternative information to include in the notification in order to escalate notification 206. Additionally or alternatively, notification application 150 may automatically perform one or more additional operations. For example, notification application 150 may escalate notification 206 by outputting the notification via additional or alternative modalities (e.g., outputting a sound to accompany the visual notification) without waiting for another notification signal from the fuel sub-system. As another example of notification escalation, notification application 150 may escalate a subsequent notification related to notification 206 (e.g., a subsequent low fuel notification indicating a further-reduced range remaining due to further depletion of the fuel). Other examples of escalation of the notification include displaying the notification at a larger size (e.g., larger font size), moving the notification (e.g., displaying the notification on another, larger display), increasing the brightness and/or a contrast of the notification, intervening in operation of the vehicle (e.g., activating automatic braking), adding an audio and/or a tactile component (e.g., a beep, vibrations, and/or the like) to the notification, and/or the like.

In some embodiments, the determination of whether the occupant has given attention includes a duration component (e.g., time, distance traveled by the vehicle, and/or the like). In particular, notification application 150 may determine, based on the frequency matching over a duration starting from when the notification (e.g., notification 206) is first presented, whether the occupant has given attention to the notification. If notification application 150 determines that the notification oscillation frequency and the frequency exhibited by the eye pupil do not match for at least a threshold duration, then notification application 150 determines that the occupant has not given attention to the notification. In response to that determination, notification application 150 may send the negative attention signal and/or escalate the notification. In this manner, the occupant is afforded a duration (e.g., period of time, distance traveled) to detect the notification and give attention to the attention before notification application 150 determines that attention is not given.

If the oscillation frequency of notification 206 and the eye pupil oscillation frequency match (e.g., the difference between the two frequencies is within the predefined tolerance), then notification application 150 determines that the occupant has given attention to notification 206. In response to the determination that occupant has given attention to notification 206, notification application 150 may send a positive attention signal to the fuel sub-system. The fuel sub-system, in response to the positive attention signal, may maintain or cease the notification signal, or send another notification signal that de-escalates the notification (e.g., removing certain information from the notification, removing a notification modality, dimming the notification, and/or the like) to notification application 150. In response to the de-escalation notification signal, notification application 150 may reverse one or more of the notification escalation aspects described above.

In some embodiments, the attention signal includes a flag that indicates the attention or lack thereof. For example, a negative attention signal includes a 0 flag indicating attention not given, and a positive attention signal includes a 1 flag indicating attention given. Notification application 150 may maintain the flag in memory 116, set the flag to 1 in response to a determination that attention has been given to the notification, reset the flag in response to ceasing or dismissal of the notification, and/or include the flag in an attention signal sent to vehicular sub-system 122.

Notification application 150 may output other notifications in a similar manner as described above in response to notification signals from various vehicular sub-systems 122. For example, notification application 150 may display a vehicle door ajar notification based on a notification signal from a vehicle door sub-system (e.g., when the vehicle door sub-system detects that a vehicle door is ajar). Notification application 150 may display and oscillate the door ajar notification, via a blinking indicator light 218, by causing indicator light 218 to blink at a selected oscillation frequency. Notification application 150 may determine that the occupant has not given attention to the vehicle door ajar notification for at least a threshold duration (e.g., duration of time) since the notification is displayed. In response to that determination, notification application 150 may send a negative attention signal to the door sub-system and/or escalate the notification.

Notification application 150 may display an oil change due notification 216 based on a notification signal from a maintenance tracking sub-system (e.g., when the maintenance tracking sub-system detects that the distance traveled by the vehicle since the last oil change exceeds a predefined oil change mileage threshold). Notification application 150 may output oil change due notification 216 on center console display 214 with a brightness (of the text, the background, or both) that oscillates at a selected oscillation frequency. Notification application 150 may determine that the occupant has not given attention to the oil change notification for at least a threshold duration (e.g., length of distance traveled) since the notification is displayed. In response to that determination, notification application 150 may send a negative attention signal to the maintenance tracking sub-system and/or escalate the notification.

Furthermore, notification application 150 may output heads-up or augmented reality notifications in a similar manner. For example, notification application 150 may cause an outline or a bounding box 212 to be displayed (e.g., displayed on or projected onto windshield 208) based on a notification signal from a driver assistance sub-system (e.g., when the driver assistance sub-system detects a pedestrian in proximity of the vehicle). Outline 212 surrounds an object in proximity of the vehicle (e.g., pedestrian 210 outside of the vehicle), as viewed through windshield 208. As pedestrian 210 moves outside of the vehicle, notification application 150 may adjust the position of the projection of the outline 212 so that outline 212 follows pedestrian 210 as viewed through windshield 208. Notification application 150 may cause outline 212 to blink at a selected oscillation frequency and determine whether the driver has given attention to outline 212 (and accordingly has given attention to pedestrian 210). If the eye pupil oscillation frequency does not match the oscillation frequency of outline 212, notification application 150 may determine that the driver has not given attention to pedestrian 210 and, in response, cause output of additional notifications of the presence of pedestrian 210 (e.g., by causing output of an auditory obstacle alert). As another example, notification application 150 may cause navigation information (e.g., upcoming turn notification 220) to be projected onto windshield 208 based on a notification signal from a navigation sub-system (e.g., when the navigation sub-system detects an upcoming turn on a navigation route). Notification application 150 may cause upcoming turn notification 220 to blink at a selected oscillation frequency and determine whether the driver has given attention to turn notification 220. If the eye pupil oscillation frequency does not match the oscillation frequency of turn notification 220, notification application 150 may determine that the driver has not given attention to turn notification 220 and, in response, escalate the turn notification 220 (e.g., by causing output of an auditory navigation guidance).

Oscillations of notifications described above include blinking (e.g., oscillating between on and off, between displayed and not displayed) and oscillation of the brightness. It should be appreciated that other types of oscillations of a visual notification are possible. For example, notification application 150 may cause a notification to oscillate between two colors, between two different shades (e.g., a lighter shade and a darker shade) of the same color, and/or between a first contrast level and a second contrast level. The oscillation of color, color shade, and/or contrast level may be gradual (e.g., smooth and continuous) or discrete (e.g., stepwise).

In some embodiments, notifications that are displayed concurrently may have different oscillation frequencies. When selecting an oscillation frequency for a notification, notification application 150 selects a frequency that is different from the oscillation frequencies of other currently presented notifications. By having different oscillation frequencies for different notifications that are concurrently presented, notification application 150 can determine the attention (or lack thereof) given to each of the notifications by matching the eye pupil oscillation frequency to the different notification oscillation frequencies. Additionally, in some embodiments, to account for the amount of ambient light, notification application 150 may dynamically adjust the oscillation frequency of a notification and/or adjust the first and/or second levels (e.g., high and/or low brightness levels) of the oscillation of the notification based on the amount of ambient light.

By using the above-disclosed techniques, attention given to a notification may be determined without reliance on checking a direction of eye gaze and with higher accuracy than determining attention based on direction of eye gaze. Furthermore, attention given to a notification in the peripheral vision of the occupant may be determined using the above-disclosed techniques, because focal view is not necessary for adoption of a frequency of a visual stimulus by an eye pupil based on pupil frequency tagging.

Figure 3A:
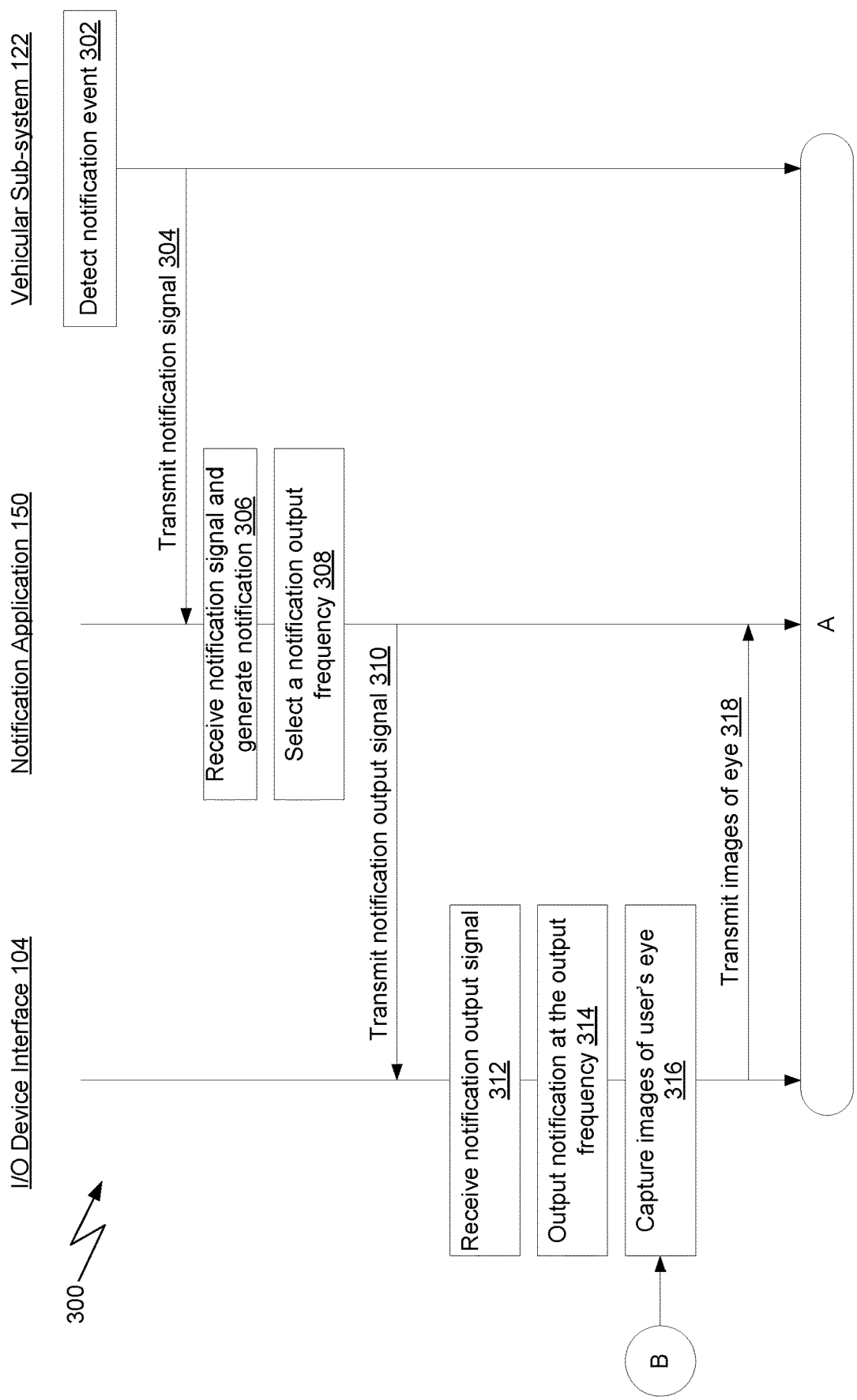
FIGS. 3A-3B illustrate a flow diagram of a process for presenting attention-based notifications, according to one or more aspects of the various embodiments.
Figure 3B:
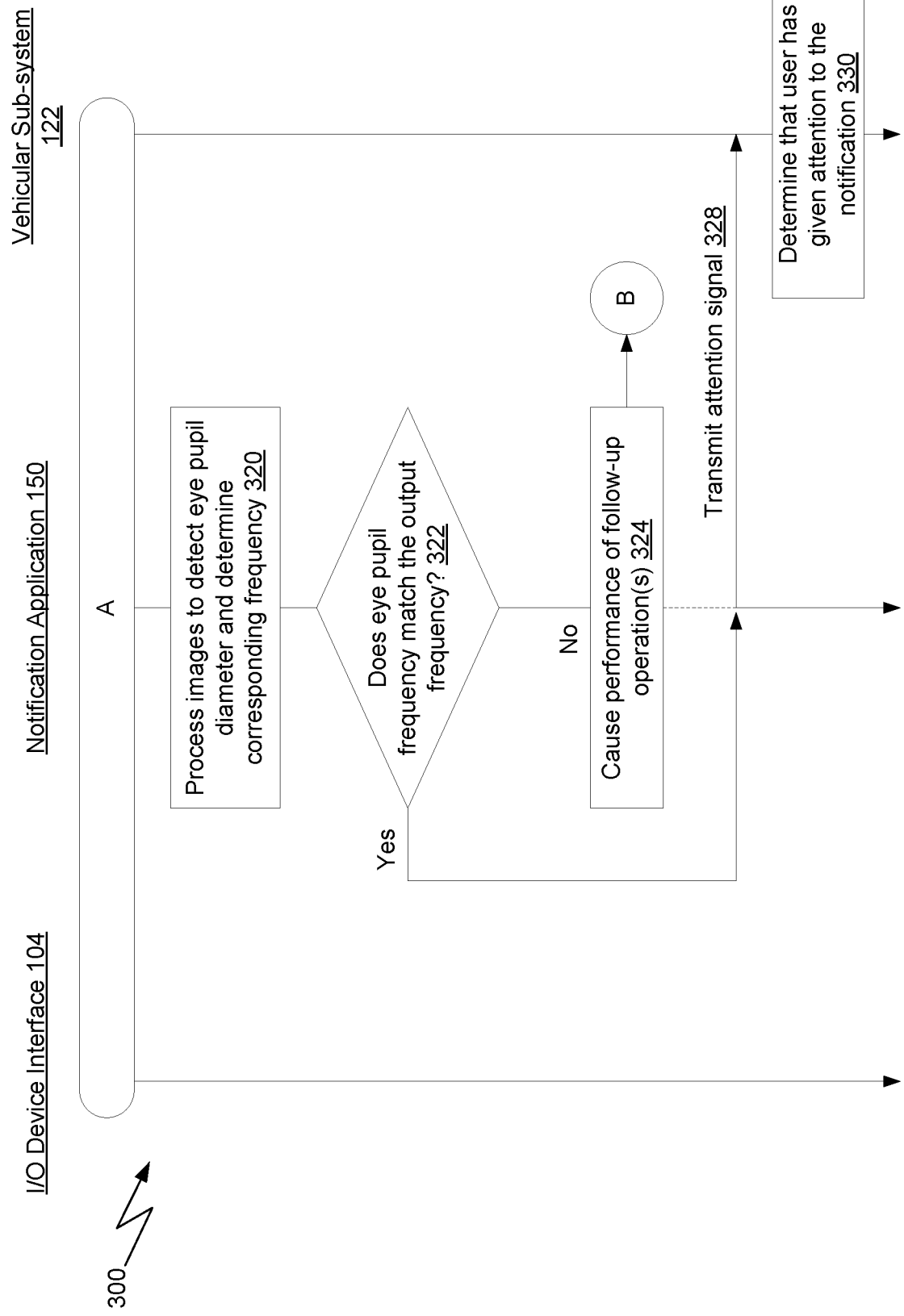

FIGS. 3A-3B illustrate a flow diagram of a process 300 for presenting attention-based notifications, according to one or more aspects of the various embodiments. Process 300 begins with step 302, where a vehicular sub-system 122 detects a notification event. A vehicular sub-system 122 may detect an event or condition that satisfies a trigger criterion for a notification. For example, a fuel sub-system may detect that the remaining fuel has dropped below a threshold. As another example, a maintenance tracking sub-system may detect that the vehicle is due for an oil change based on a time or mileage traveled duration since the last oil change. As a further example, a driver assistance sub-system may detect that the distance of the vehicle to another vehicle in the direction of travel has dropped below a threshold.

At step 304, vehicular sub-system 122 transmits a notification signal to notification application 150. The notification signal may indicate the contents and modality of a visual notification to be generated. At step 306, notification application 150 receives the notification signal and generates a visual notification based on the notification signal. At step 308, notification application 150 selects a notification output frequency. Notification application 150 selects an oscillation frequency for the notification that is different from the oscillation frequencies of other currently presented notifications, if any. At step 310, notification application 150 transmits a notification output signal to I/O device interface 104 for output via an I/O device 108 (e.g., display 134, indicator light 136, and/or the like).

At step 312, I/O device interface 104 receives the notification output signal. At step 314, I/O device interface 104 outputs the notification at the selected output frequency via an I/O device 108. At step 316, I/O device interface 104 captures images (e.g., a sequence of images) of at least one eye of an occupant of the vehicle (e.g., the driver) via an imaging device 142. At step 318, I/O device interface 104 transmits the images to notification application 150.

Continuing in FIG. 3B, at step 320, notification application 150 processes the images to detect the eye pupil diameter and the corresponding frequency of pupil constrictions and dilations. Notification application 150 recognizes the pupil of the eye in each image and determines a corresponding pupil diameter using any technically feasible technique (e.g., machine learning-based object recognition), resulting in a sequence of measured pupil diameter values, ordered based on timestamps of the images. Notification application 150 determines an eye pupil oscillation frequency (e.g., the frequency of pupil constrictions and dilations) based on the sequence of pupil diameter values. If notification application 150 determines that the oscillation of the eye pupil diameter does not exhibit a determinable frequency (e.g., the eye pupil diameter changes erratically or randomly with no determinable oscillation or oscillation pattern), then notification application 150 may determine that the eye pupil oscillation frequency is null.

At step 322, notification application 150 determines whether the eye pupil oscillation frequency, determined in step 320, matches the oscillation frequency of the notification. If notification application 150 determines that the frequencies match, then at step 328 notification application 150 transmits a positive attention signal to vehicular sub-system 122. At step 330, vehicular sub-system 122 receives the positive attention signal and determines, based on the positive attention signal, that the user has given attention to the notification. In response to that determination, vehicular sub-system 122 may maintain or cease the notification signal or send a notification signal for a de-escalated notification to notification application 150.

If notification application 150 determines that the frequencies do not match or the eye pupil oscillation frequency is null, then at step 324 notification application 150 causes one or more follow-up operations to be performed. The follow-up operations may include transmitting a negative attention signal to vehicular sub-system 122, escalating the notification, and/or intervening in operation of the vehicle. Process 300 then returns to step 316, where new images of the eye of the user are captured, so that an updated eye pupil oscillation frequency may be determined and compared to the notification oscillation frequency.

Figure 4:
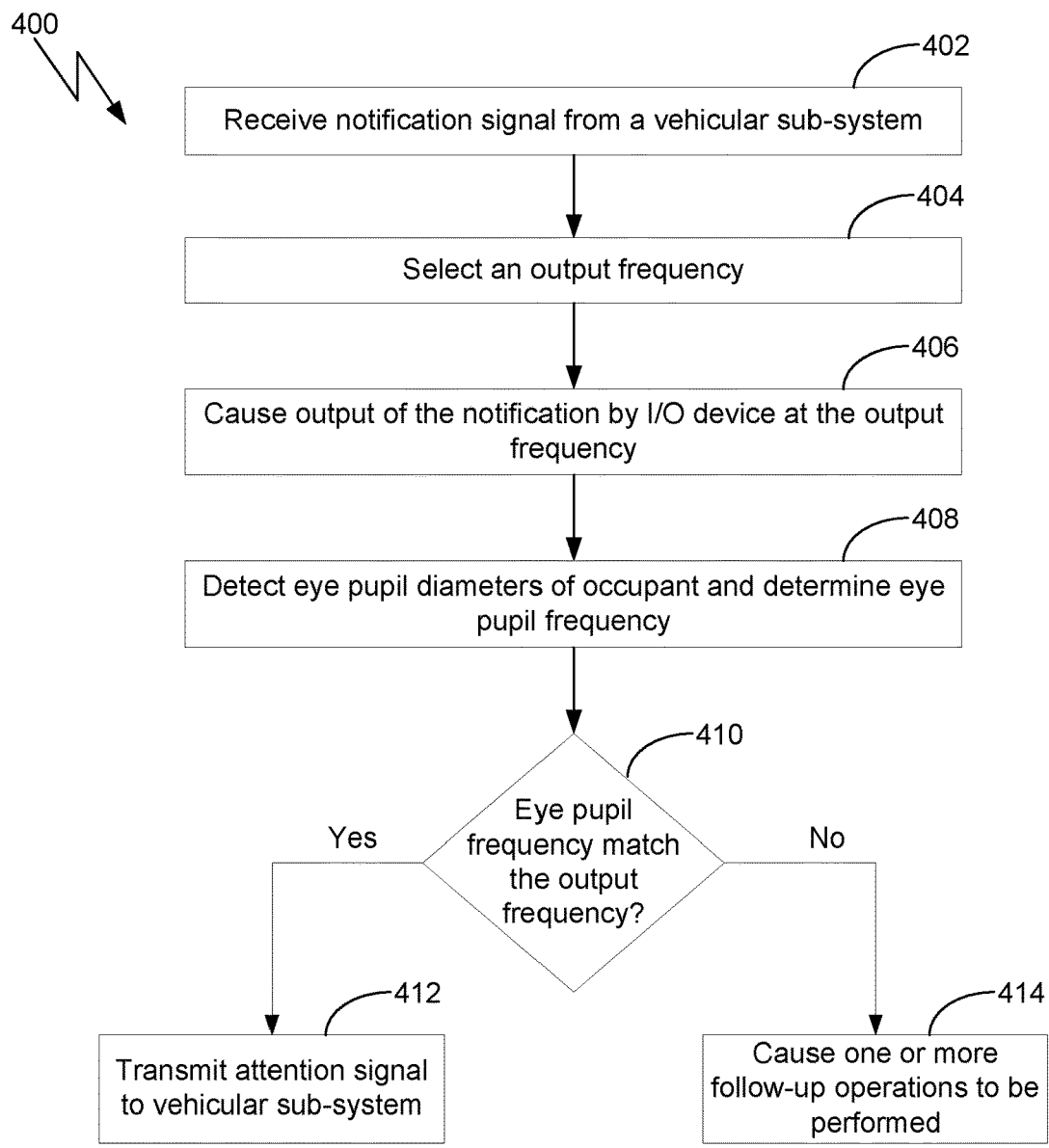
FIG. 4 illustrates a flow diagram of method steps for presenting attention-based notifications, according to one or more aspects of the various embodiments.

FIG. 4 illustrates a flow diagram of method steps for presenting attention-based notifications, according to one or more aspects of the various embodiments. Although the method steps are described in conjunction with the systems of FIGS. 1-3B, persons skilled in the art will understand that any system configured to perform the method steps, in any order, falls within the scope of the various embodiments.

A method 400 begins at step 402, where notification application 150 receives a notification signal from a vehicular sub-system. Notification application 150 may receive, from a vehicular sub-system 122, a signal indicating a content, and optionally a modality, of a visual notification to be presented to an occupant of the vehicle (e.g., the driver). Notification application 150 may generate the visual notification based on the notification signal.

At step 404, notification application 150 selects an output frequency for the notification to be presented. At step 406, notification application 150 causes output of the notification by an I/O device at the output frequency. Notification application 150 outputs the visual notification to an I/O device 108 (e.g., display 134, indicator light 136, and/or the like) such that the notification (e.g., the brightness of the notification) oscillates at the output frequency.

At step 408, notification application 150 detects eye pupil diameters of the occupant over a time period. Based on these eye pupil diameters, notification application 150 determines an eye pupil oscillation frequency, that is a frequency of oscillation of the eye pupil diameter between a high diameter value and a low diameter value (e.g., a frequency of pupil constrictions and dilations). Additionally, if notification application 150 determines that the oscillation of the eye pupil diameter does not exhibit a determinable frequency (e.g., the eye pupil diameter changes erratically or randomly with no determinable oscillation or oscillation pattern), then notification application 150 may determine that the eye pupil oscillation frequency is not detected.

At step 410, notification application 150 determines whether the eye pupil oscillation frequency matches the output frequency of the notification. If the frequencies match (e.g., within a predefined tolerance), then method 400 proceeds to step 412, where notification application 150 transmits a positive attention signal to vehicular sub-system 122 to signal the sub-system that attention has been given to the notification.

If the frequencies do not match or if the eye pupil oscillation frequency is not detected, then method 400 proceeds to step 414, where notification application 150 causes one or more follow-up operations to be performed. The follow-up operations may include, for example, causing follow-up notifications to be output, causing the notifications to be displayed in additional modalities, causing the notification to be output differently (e.g., increased in size, displayed at a different on-screen position), and/or intervene in the operation of the vehicle (e.g., activate automatic braking). The follow-up operations may further include transmitting a negative attention signal to vehicular sub-system 122 to signal the sub-system that attention has not been given to the notification.

Figure 5:
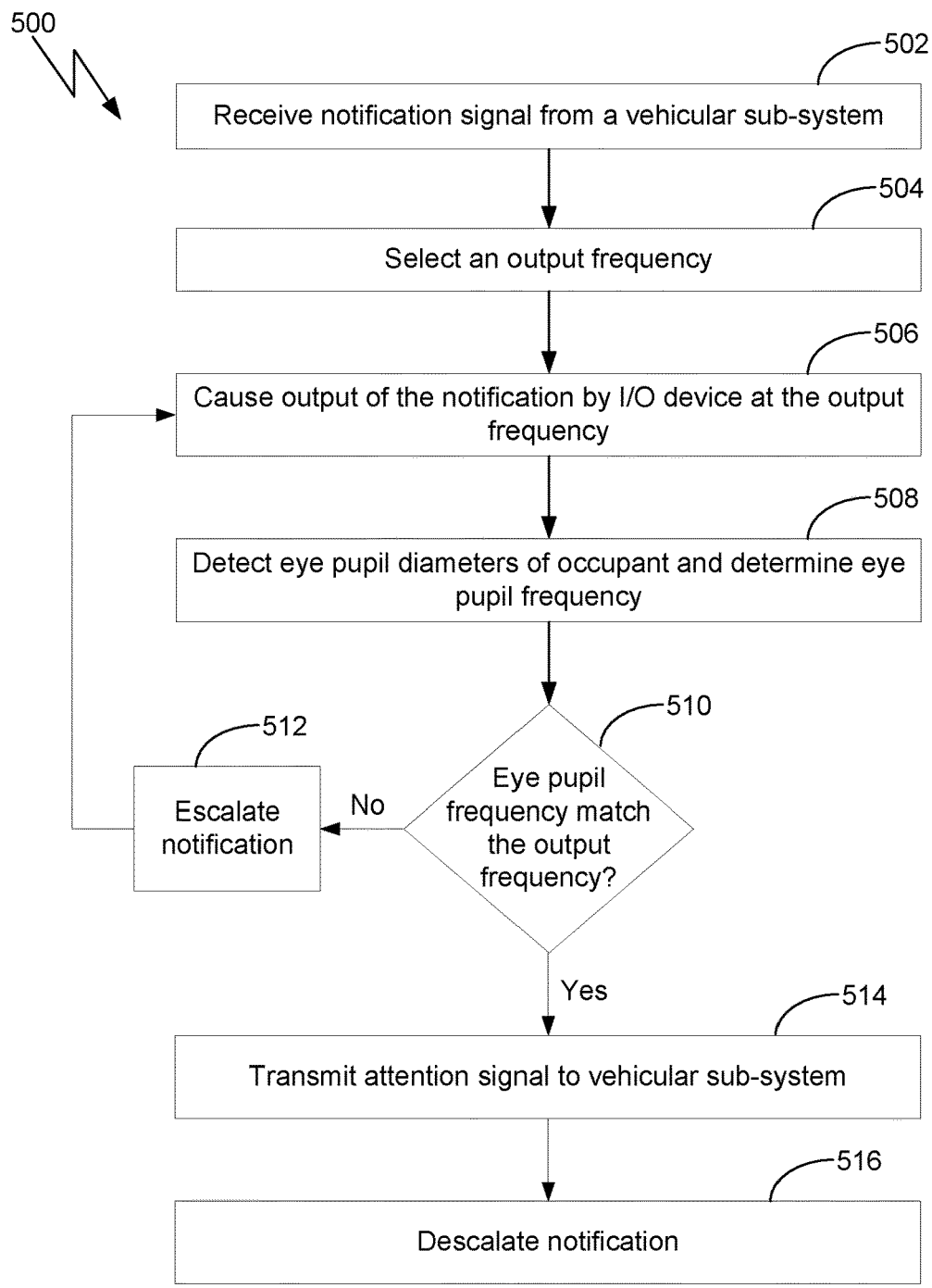
FIG. 5 illustrates another flow diagram of method steps for presenting attention-based notifications, according to one or more aspects of the various embodiments.

FIG. 5 illustrates another flow diagram of method steps for presenting attention-based notifications, according to one or more aspects of the various embodiments. Although the method steps are described in conjunction with the systems of FIGS. 1-3B, persons skilled in the art will understand that any system configured to perform the method steps, in any order, falls within the scope of the various embodiments.

A method 500 begins at step 502, where notification application 150 receives a notification signal from a vehicular sub-system. Notification application 150 may receive, from a vehicular sub-system 122, a signal indicating a content, and optionally a modality, of a visual notification to be presented to an occupant of the vehicle (e.g., the driver). Notification application 150 may generate the visual notification based on the notification signal.

At step 504, notification application 150 selects an output frequency for the notification to be presented. At step 506, notification application 150 causes output of the notification by an I/O device at the output frequency. Notification application 150 outputs the visual notification to an I/O device 108 (e.g., display 134, indicator light 136) such that the notification (e.g., the brightness of the notification) oscillates at the output frequency.

At step 508, notification application 150 detects eye pupil diameters of the occupant over a time period. Based on these eye pupil diameters, notification application 150 determines an eye pupil oscillation frequency, that is a frequency of oscillation of the eye pupil diameter between a high diameter value and a low diameter value (e.g., a frequency of pupil constrictions and dilations). Additionally, if notification application 150 determines that the oscillation of the eye pupil diameter does not exhibit a determinable frequency (e.g., the eye pupil diameter changes erratically or randomly with no determinable oscillation or oscillation pattern), then notification application 150 may determine that the eye pupil oscillation frequency is not detected.

At step 510, notification application 150 determines whether the eye pupil oscillation frequency matches the output frequency of the notification. If the frequencies do not match or if the eye pupil oscillation frequency is not detected, then method 500 proceeds to step 512, where notification application 150 escalates the notification (e.g., presenting the notification in a different modality). From step 512, method 500 proceeds to step 506, where the notification (or a related follow-on notification) may continue to be output at the same or different output frequency. Method 500 then proceeds to step 508, where notification application 150 may again determine an eye pupil oscillation frequency to compare against the notification output frequency.

If the frequencies match, then method 500 proceeds to step 514, where notification application 150 transmits a positive attention signal to vehicular sub-system 122 to signal the sub-system that attention has been given to the notification. At step 516, notification application 150 de-escalates the notification. Step 516 may be omitted if the notification had not been escalated and thus no de-escalation is needed.

In some embodiments, other user characteristics may be measured to determine a frequency exhibited by the user, in addition or alternatively to the eye pupil diameter and associated frequency. For example, biometric sensors may measure an electroencephalograph (EEG) or magnetoencephalography (MEG) of a user. A frequency may be determined from the EEG or MEG and compared against the oscillation frequency of the notification.

In some embodiments, notification application 150 may cause notifications to be output with more complex patterns. For example, notification application 150 may cause a notification to oscillate with a first frequency for a first (e.g., a brief) period of time, then, after a brief pause, oscillate (e.g., the brightness) with a second frequency (which many be the same as or different from the first frequency) for a second (e.g., longer) period of time. In some examples, notification application 150 may cause the notification to oscillate at additional frequencies (which many be the same as or different from the first or second frequencies) for additional periods of time. This multi-period pattern may be repeated. Thus, the notification may be oscillated according to a repeatable temporal pattern that includes brief and/or longer periods of oscillations at different frequencies and/or brightness levels. Notification application 150 processes images of the eye of the vehicle occupant to determine whether the eye pupil diameter and changes thereof exhibit the same temporal pattern with the same frequencies as the notification. If the eye pupil diameter changes exhibit the same pattern with the same frequencies, then notification application 150 determines that the occupant has given attention to the notification. If the eye pupil diameter changes exhibit different frequencies than the notification and/or do not exhibit the same pattern, then notification application 150 determines that the occupant has not given attention to the notification.

While the above-disclosed techniques are described with respect to notifications in a vehicle, similar techniques may be performed in other contexts. For example, an electronic kiosk in a building or space (e.g., an electronic directory and map kiosk in a shopping mall, a hotel resort, an amusement park, or the like) may include a display device and an imaging device. When a user requests directions to a particular location at the electronic kiosk, the electronic kiosk may display, on a map, the requested location and/or a path to the requested location at an oscillation frequency (e.g., blink a location marker at the oscillation frequency), similar to the oscillation of notifications described above. An imaging device may capture images of the eye(s) of the user, and the electronic kiosk determines an eye pupil oscillation frequency based on the images. The electronic kiosk determines whether the eye pupil oscillation frequency matches the oscillation frequency of the directions. If the electronic kiosk determines that the frequencies do not match, the electronic kiosk may escalate the presentation of the directions (e.g., zoom in on the location, move the map as if traversing the path, play a sound). As another example, a wearable device may display augmented reality content at an oscillation frequency and determine whether the user has given attention to the augmented reality content by determining an eye pupil oscillation frequency and comparing that frequency to the oscillation frequency of the augmented reality content.

Additionally, the above-disclosed techniques may be adapted for use in empirical research and analysis (e.g., to aid in the design of user interfaces for vehicles). For example, multiple options may be considered in the design of a notification presentation modality (e.g., the design of a dashboard). A designer may test various design options for, and optimize, the notification presentation modality by using the above-disclosed techniques to determine which modality options are more effective in gaining vehicle occupant attention.

In sum, a computing system determines whether attention was given to an indicator or notification. The computing system displays a notification by oscillating an amplitude (e.g., brightness, luminescence) of the notification at a first frequency. The computer system includes one or more sensors that gather sensor data associated with a characteristic (e.g., eye pupil diameter) of the user. The computer system determines whether the sensor data indicates a second frequency associated with the characteristic, and that the second frequency substantially matches the first frequency. If the first frequency and second frequency do not match, or the sensor data does not indicate a frequency associated with the characteristic, then the computer system may perform one or more further operations. Examples of the further operations include delivering the notification via a different modality, escalating the notification, automatically intervening in operation of a device or system, and/or the like. In some embodiments, the computer system may be implemented in a vehicle, and the sensors include a camera device.

At least one advantage and technological improvement of the disclosed techniques is that a computing system (e.g., a computing device of a vehicle) may determine attention or lack thereof given to a notification without requiring an interactive response from the user. Accordingly, the computing system can ascertain whether a user (e.g., an occupant of the vehicle) is attentive to the notification, without distracting the user from other tasks. Further, the computing system may perform one or more follow-up operations based on whether attention was given to the notification or not. The follow-up operations may include presenting the notification via a different modality, escalating the notification, automatically intervening in operation of a device or system, and/or the like. Another advantage and technological improvement of the disclosed techniques is that a computing system may determine which modalities of delivering notifications are more likely to get the attention of the user. The computing system may accordingly favor certain modalities in the delivery of notifications. A further advantage and technological improvement is that attention given to a notification by a user may be detected even when the notification is not within a focal view of the user. Another advantage and technological improvement is that attention given to a notification by a user may be determined with higher accuracy compared to conventional approaches (e.g., determination based on direction of eye gaze).

1. In some embodiments, a computer-implemented method comprises causing a first visual stimulus to be oscillated at a first frequency; determining a second frequency associated with a user characteristic; and based on a determination that the second frequency does not match the first frequency, causing one or more operations to be performed.

2. The method of clause 1, wherein causing the first visual stimulus to be oscillated at the first frequency comprises oscillating a brightness amplitude of the first visual stimulus at the first frequency.

3. The method of clauses 1 or 2, wherein the first visual stimulus comprises an indicator light.

4. The method of any of clauses 1-3, wherein causing the first visual stimulus to be oscillated at the first frequency comprises blinking the indicator light at the first frequency.

5. The method of any of clauses 1-4, wherein the first visual stimulus comprises a notification displayed via a display device.

6. The method of any of clauses 1-5, wherein the user characteristic comprises an eye pupil diameter of a user.

7. The method of any of clauses 1-6, wherein the second frequency corresponds to an oscillation of the eye pupil diameter.

8. The method of any of clauses 1-7, wherein determining the second frequency comprises capturing images of an eye of the user via an imaging device to determine the eye pupil diameter.

9. The method of any of clauses 1-8, wherein the user characteristic comprises an electroencephalograph (EEG) of a user or a magnetoencephalograph (MEG) of the user.

10. The method of any of clauses 1-9, further comprising determining, based on the determination that the second frequency does not match the first frequency, a lack of attention on the first visual stimulus by a user.

11. The method of any of clauses 1-10, wherein causing one or more operations to be performed comprises, in response to determining the lack of attention on the first visual stimulus by the user, causing a second visual stimulus associated with the first visual stimulus to be output.

12. The method of any of clauses 1-11, wherein the second visual stimulus is an enlarged version of the first visual stimulus.

13. The method of any of clauses 1-12, wherein causing one or more operations to be performed comprises, in response to determining the lack of attention on the first visual stimulus by the user, causing an audio component associated with the first visual stimulus to be output.

14. The method of any of clauses 1-13, wherein causing one or more operations to be performed comprises, in response to determining the lack of attention on the first visual stimulus by the user, intervening in operation of a first sub-system.

15. In some embodiments, one or more non-transitory computer-readable storage media include instructions that, when executed by one or more processors, cause the one or more processors to perform the steps of causing a first visual stimulus to be oscillated at a first frequency; determining a second frequency associated with a user characteristic; and based on a determination that the second frequency does not match the first frequency, determining a lack of attention on the first visual stimulus by a user.

16. The one or more computer-readable storage media of clause 15, wherein causing the first visual stimulus to be oscillated at the first frequency comprises at least one of: oscillating a brightness amplitude of the first visual stimulus at the first frequency, or blinking the first visual stimulus at the first frequency.

17. The one or more computer-readable storage media of clauses 15 or 16, further comprising instructions that, when executed by the one or more processors, cause the one or more processors to perform the steps of, in response to determining the lack of attention on the first visual stimulus by the user, at least one of: causing a second visual stimulus associated with the first visual stimulus to be output, causing an audio component associated with the first visual stimulus to be output, or intervening in operation of a first sub-system.

18. In some embodiments, a system comprises a memory storing an application and a processor that, when executing the application, is configured to cause a first visual stimulus to be oscillated at a first frequency; determine a second frequency associated with a pupil of an eye; based on a determination that the second frequency does not match the first frequency, determine a lack of attention on the first visual stimulus; and in response to determining the lack of attention on the first visual stimulus, cause one or more operations to be performed.

19. The system of clause 18, wherein causing one or more operations to be performed comprises causing a second visual stimulus associated with the first visual stimulus to be output at a third frequency.

20. The system of clauses 18 or 19, wherein the processor, when executing the application, is further configured to determine a fourth frequency associated with the pupil of the eye; and based on a determination that the fourth frequency matches the third frequency, determine a presence of attention on the second visual stimulus.

Any and all combinations of any of the claim elements recited in any of the claims and/or any elements described in this application, in any fashion, fall within the contemplated scope of the present protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   causing a first visual stimulus to be oscillated with a first frequency pattern, wherein the first visual stimulus comprises a first notification, and wherein the first frequency pattern comprises oscillation at a first frequency for a first period of time and oscillation at a second frequency for a second period of time subsequent to the first period of time;
   determining a second frequency pattern associated with a user characteristic; and
   in response to a determination that the second frequency pattern does not match the first frequency pattern, causing a second notification to be output, wherein the second notification comprises an audio notification or a haptic notification.

2. The method of claim 1, wherein the step of causing the first visual stimulus to be oscillated with the first frequency pattern comprises oscillating a brightness amplitude of the first visual stimulus with the first frequency pattern.

3. The method of claim 1, wherein the first visual stimulus comprises an indicator light.

4. The method of claim 3, wherein the step of causing the first visual stimulus to be oscillated with the first frequency pattern comprises blinking the indicator light with the first frequency pattern.

5. The method of claim 1, wherein the first visual stimulus is displayed via a display device.

6. The method of claim 1, wherein the user characteristic comprises an eye pupil diameter of a user.

7. The method of claim 6, wherein the second frequency pattern corresponds to an oscillation of the eye pupil diameter.

8. The method of claim 6, wherein the step of determining the second frequency pattern comprises capturing images of an eye of the user via an imaging device to determine the eye pupil diameter.

9. The method of claim 1, wherein the user characteristic comprises an electroencephalograph (EEG) of a user or a magnetoencephalograph (MEG) of the user.

10. The method of claim 1, further comprising determining, in response to the determination that the second frequency pattern does not match the first frequency pattern, a lack of attention on the first visual stimulus by a user.

11. The method of claim 1, further comprising, in response to the determination that the second frequency pattern does not match the first frequency pattern, further causing a second visual stimulus to be output.

12. The method of claim 11, wherein the second visual stimulus is an enlarged version of the first visual stimulus.

13. The method of claim 1, further comprising, in response to the determination that the second frequency pattern does not match the first frequency pattern, further intervening in operation of a first sub-system.

14. The method of claim 13, wherein the first sub-system comprises one of a fuel sub-system, a tire sub-system, an engine sub-system, a transmission sub-system, a driver assistance sub-system, a maintenance tracking sub-system, a vehicle door sub-system, a navigation sub-system, or an infotainment sub-system.

15. One or more non-transitory computer-readable storage media including instructions that, when executed by one or more processors, cause the one or more processors to perform the steps of:
   causing a first visual stimulus to be oscillated with a first frequency pattern, wherein the first visual stimulus comprises a first notification, and wherein the first frequency pattern comprises oscillation at a first frequency for a first period of time and oscillation at a second frequency for a second period of time subsequent to the first period of time;
   determining a second frequency pattern associated with a user characteristic; and
   in response to a determination that the second frequency pattern does not match the first frequency pattern, causing a second notification to be output, wherein the second notification comprises an audio notification or a haptic notification.

16. The one or more computer-readable storage media of claim 15, wherein the step of causing the first visual stimulus to be oscillated at the first frequency pattern comprises at least one of: oscillating a brightness amplitude of the first visual stimulus with the first frequency pattern, or blinking the first visual stimulus with the first frequency pattern.

17. The one or more computer-readable storage media of claim 15, further comprising instructions that, when executed by the one or more processors, cause the one or more processors to perform the steps of:
   in response to the determination that the second frequency pattern does not match the first frequency pattern, further:
      causing a second visual stimulus associated with the first visual stimulus to be output, or
      intervening in operation of a first sub-system.

18. A system, comprising:
   a memory storing an application; and
   a processor that, when executing the application, is configured to:
      cause a first visual stimulus to be oscillated with a first frequency pattern, wherein the first visual stimulus comprises a first notification, and wherein the first frequency pattern comprises oscillation at a first frequency for a first period of time and oscillation at a second frequency for a second period of time subsequent to the first period of time;

determine a second frequency pattern associated with a pupil of an eye;

in response to a determination that the second frequency pattern does not match the first frequency pattern, determine a lack of attention on the first visual stimulus; and in response to determining the lack of attention on the first visual stimulus, cause a second notification to be output, wherein the second notification, wherein the second notification comprises an audio notification or a haptic notification.

19. The system of claim 18, further comprising, in response to determining the lack of attention on the first visual stimulus, causing a second visual stimulus associated with the first visual stimulus to be output with a third frequency pattern.

20. The system of claim 19, wherein the processor, when executing the application, is further configured to:

determine a fourth frequency pattern associated with the pupil of the eye; and in response to a determination that the fourth frequency pattern matches the third frequency pattern, determine a presence of attention on the second visual stimulus.

* * * * *